United States Patent
Wybenga et al.

(10) Patent No.: US 7,512,089 B2
(45) Date of Patent: Mar. 31, 2009

(54) MAC LAYER PROTOCOL FOR A WIRELESS DSL NETWORK

(75) Inventors: Jack C. Wybenga, Plano, TX (US); Patricia Kay Sturm, McKinney, TX (US); Gary Russell Chesnut, Granbury, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 709 days.

(21) Appl. No.: 10/720,899

(22) Filed: Nov. 21, 2003

(65) Prior Publication Data

US 2005/0111398 A1    May 26, 2005

(51) Int. Cl.
*H04Q 7/00* (2006.01)
*H04B 7/212* (2006.01)

(52) U.S. Cl. ........................ 370/328; 370/329; 370/322

(58) Field of Classification Search ................ 370/328, 370/350, 280, 449, 329, 322, 468, 231, 235, 370/237, 230, 315; 455/453
See application file for complete search history.

(56) References Cited

U.S. PATENT DOCUMENTS

| | | | | |
|---|---|---|---|---|
| 6,016,311 A * | 1/2000 | Gilbert et al. | ................ | 370/280 |
| 6,683,866 B1 * | 1/2004 | Stanwood et al. | ........... | 370/350 |
| 6,842,437 B1 * | 1/2005 | Heath | ......................... | 370/322 |
| 6,925,068 B1 * | 8/2005 | Stanwood et al. | ........... | 370/329 |
| 6,956,834 B2 * | 10/2005 | Stanwood et al. | ........... | 370/329 |
| 2002/0080816 A1 * | 6/2002 | Spinar et al. | ................ | 370/449 |
| 2002/0122395 A1 * | 9/2002 | Bourlas et al. | ............. | 370/329 |
| 2004/0057461 A1 * | 3/2004 | Dawidowsky et al. | ....... | 370/468 |

* cited by examiner

*Primary Examiner*—George Eng
*Assistant Examiner*—Kiet Doan

(57) ABSTRACT

A base station for use in a point-to-multipoint wireless network. The base station transmits downstream data packets in a downstream traffic channel to customer premises equipment (CPE) devices and receives upstream data packets in an upstream traffic channel from the CPE devices. The base station determines queue status of at least one queue associated with at least one application in each of the CPE devices and, in response to the determination, the base station reallocates bandwidth from a first queue associated with a first CPE device to a second queue.

13 Claims, 5 Drawing Sheets

MAC LAYER PROTOCOL FOR A WIRELESS DSL NETWORK

TECHNICAL FIELD OF THE INVENTION

The present invention is directed to point-to-multipoint wireless systems and, more specifically, to a medium access control (MAC) layer protocol for use in a wireless DSL network.

BACKGROUND OF THE INVENTION

The tremendous growth of the Internet and deregulation of the telecommunications industry have caused a revolution in high-speed communications. This has led to greatly increased demands for both voice and data services and greatly reduced costs due to innovation and competition in the marketplace. The backbone of the entire telecommunications network has been improved by the introduction of wideband optical equipment.

Similarly, new wireless networks have been developed to provide wireless broadband access to businesses and homes. Service providers use a wide range of equipment and standards to provide wireless services to subscribers. For example, the DOCSIS and IEEE 802.14 standards have been proposed for wireless local multipoint distributions systems (LMDS) and wireless DSL systems. The IEEE 802.14 working group (no longer active) worked from 1992 to 2000 to create standards for data transport over cable TV networks. The DOCSIS standards are international standards for data over cable and use many of the same medium access control (MAC) layer protocols. The IEEE 802.16 working group defined MAC layer protocols specifically for LMDS. These standards define downstream allocation units and upstream mini-time slots for resource allocation. These standards use variable-length frames and use many types of MAC layer protocol messages. Point-to-multipoint wireless networks often allocate bandwidth on a per customer premises equipment (CPE) basis or on a logical upstream channel basis. These networks only allow one upstream channel per CPE.

However, the 802.16 and DOCSIS MAC designs are complex. These networks have many different message types and each has its own Layer 2 protocol. These wireless networks use variable-length frames, including mini-time slots for upstream reservations. This makes the wireless MAC layer protocol slow in bandwidth allocation response time and complex to implement. Also, the use of contention time slots makes these systems non-deterministic.

The conventional method of allocating resources on a per CPE basis forces the CPE to give a composite indicator for all of its bandwidth needs, regardless of traffic priority. This makes it difficult for the wireless network base station to handle varying priority mixes across various CPES. For example, if CPE 2 needs more bandwidth than CPE 1, but CPE 1 has a large amount of high priority traffic and CPE 2 has a small amount of high priority traffic, the base station may not determine that CPE 1 should get more bandwidth when bandwidth resources become scarce.

A CPE may prioritize the traffic it sends, thus allowing precedence to be given to the higher priority traffic. However, lower priority traffic from CPE 2 may block higher priority traffic from CPE 1. The CPE could give more detailed information on its bandwidth needs, but this uses more overhead channel bandwidth and may become too cumbersome for the base station to handle.

Therefore, there is a need in the art for an improved point-to-multipoint wireless network. In particular, there is a need for a wireless network that responds quickly to changes in the bandwidth requirements of the customer premises equipment (CPE). More particularly, there is a need for a wireless network that can quickly reallocate resources (i.e., bandwidth) to various CPEs while using a minimal amount of overhead control signaling.

SUMMARY OF THE INVENTION

The present invention provides a medium access control (MAC) layer protocol for a wireless digital subscriber line (DSL) network that allows link acquisition and resource management with fast response time to bandwidth needs and uses a minimal amount of overhead channel bandwidth for bandwidth requests and resource allocation. The wireless DSL network is a point-to-multipoint system in which downstream bandwidth is a single traffic stream shared by many customer sites (i.e., customer premises equipment) and upstream bandwidth is shared in a burst transmission mode.

The wireless DSL MAC layer protocol described herein provides most resource allocation messaging in the over-the-air framing and requires only a very few message types. Putting the resource allocation in the framing, rather than receiving and acting upon resource allocation requests in the form of mini-time slots, gives faster response and uses much less bandwidth for resource allocation. Contention time slots are not needed in the wireless DSL MAC layer protocol of the present invention. This makes the system deterministic and allows the Wireless Base Channel Group more control over the wireless link.

The use of separate connections for each queue described herein allows easy priority queuing and transmission. Each queue sends its bandwidth requirements to the wireless base station and all queues are handled in the same manner. No special handling on a per CPE basis is required. This technique allows better bandwidth management than conventional point-to-multipoint bandwidth allocation methods and is less complex than a straight forward extension to current management schemes of retaining a single connection to a CPE and sending more complex bandwidth request information.

To address the above-discussed deficiencies of the prior art, it is a primary object of the present invention to provide, for use in a point-to-multipoint wireless network, a base station for transmitting downstream data packets in a downstream traffic channel to customer premises equipment (CPE) devices and receiving upstream data packets in an upstream traffic channel from the CPE devices. According to an advantageous embodiment of the present invention, the base station is capable of determining queue status of at least one queue associated with at least one application in each of the CPE devices and, in response to the determination, the base station is capable of re-allocating bandwidth from a first queue associated with a first CPE device to a second queue.

According to one embodiment of the present invention, the second queue is associated with the first CPE device.

According to another embodiment of the present invention, the second queue is associated with a second CPE device separate from the first CPE device.

According to still another embodiment of the present invention, the base station allocates bandwidth to the second queue by transmitting a first downstream data packet, wherein the first downstream data packet comprises a Next Time Slot field capable of assigning a CPE device associated with the second queue to transmit an upstream data packet in the upstream traffic channel during a next time slot following receipt of the first downstream data packet.

According to yet another embodiment of the present invention, the Next Time slot field is part of a header of the first downstream data packet.

According to a further embodiment of the present invention, the first downstream data packet comprises a payload of data directed to the first CPE device.

According to a still further embodiment of the present invention, the first downstream data packet comprises a payload of data directed to a CPE device other than the first CPE device.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed herein, and the various embodiments used to describe the principles of the present invention in this patent document are by way of illustration only and should not be construed in any way to limit the scope of the invention. Those skilled in the art will understand that the principles of the present invention may be implemented in any suitably arranged point-to-multipoint wireless network.

Figure 1:
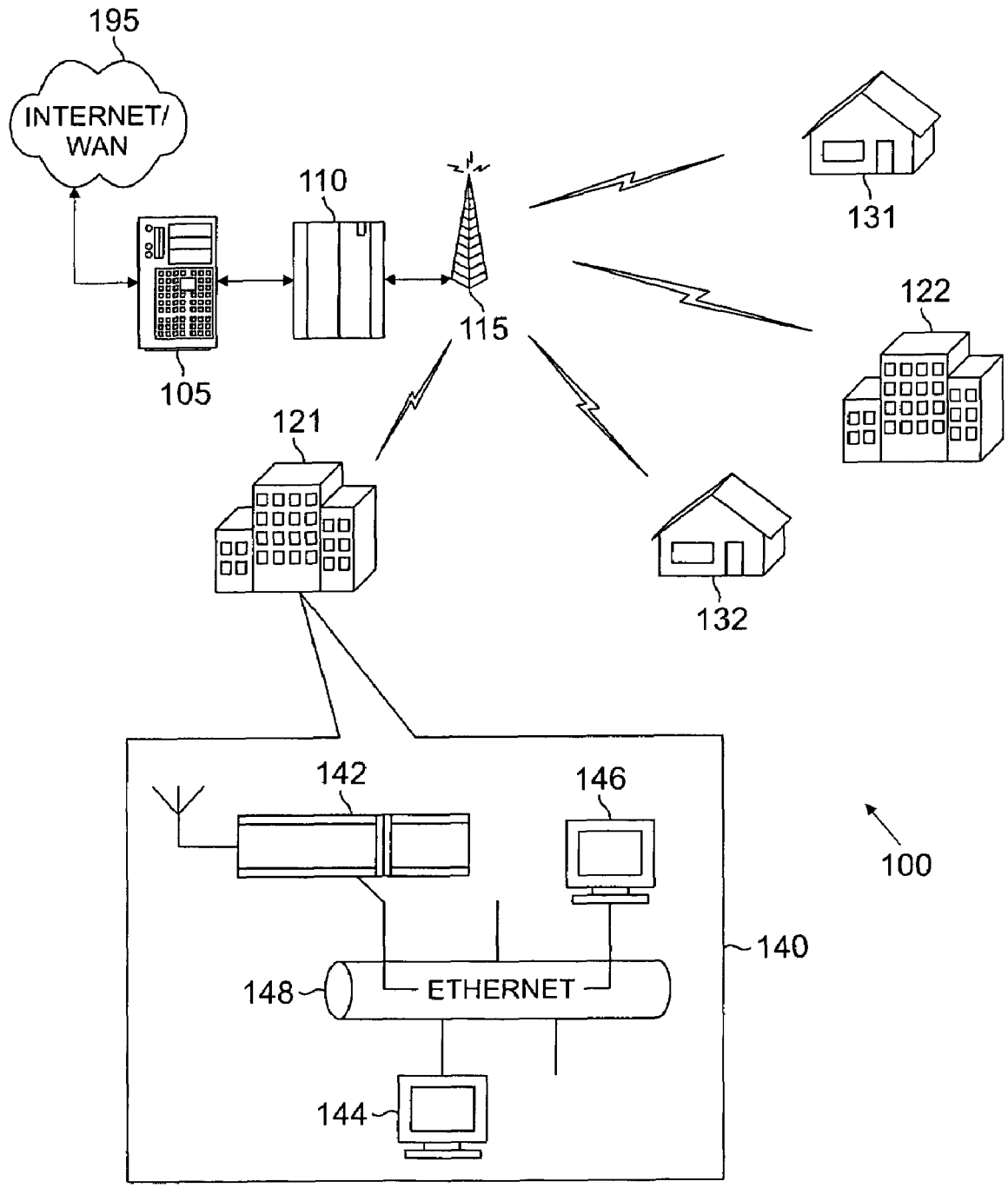
FIG. 1 illustrates a wireless point-to-multipoint network according to an exemplary embodiment of the present invention.

FIG. 1 illustrates selected portions of point-to-multipoint wireless network 100 according to an exemplary embodiment of the present invention. Wireless network 100 is a wireless DSL system that provides wireless digital subscriber line (DSL) services to a plurality of business locations, including exemplary offices 121 and 122, and to a plurality of private residences, including exemplary residences 131 and 132. According to the exemplary embodiment, the infrastructure portion of wireless network 100 comprises, in part, access 105, DSL access multiplexer (DSLAM) 110 and wireless base station 115. Access point 105 provides access to the Internet through wide area network (WAN) 195. The subscriber portion of wireless network 100 comprises customer premises equipment at each business location and private residence. Exemplary customer premises equipment (CPE) 140 in office 121 is illustrated in detail. CPE 140 comprises wireless DSL router 142, workstations 144 and 146, and Ethernet network 148.

Wireless network 100 implements a unique air interface according to the principles of the present invention between base station 115 and customer premises equipment (CPE), such as exemplary CPE 140, located in offices 121 and 122 and residences 131 and 132. This air interface provides link management for the over-the-air Point-to-Point Protocol (PPP) connections in the bi-directional communication links between each CPE and base station 115. Wireless network 100 provides link management in the form of acquisition and resource allocation services, as described below with respect to FIG. 2.

The acquisition process establishes a link between base station 115 and each CPE 140. Multiple CPEs 140 share an upstream frequency according to a Time Division Multiple Access (TDMA) air interface. Once acquired, wireless base station 115 allocates time slots to CPEs 140 to prevent collisions of upstream communications from multiple CPEs 140. These link management functions are extensions of the wireless media access control (MAC) protocol, which are typically provided by the radio vendor to manage link parameters, such as power levels. The link management messages are sent in the downstream and upstream framing, with the exception of 1) upstream parameters, which are sent in the payload of an Acquisition Poll message, and 2) timing synchronization information, which is sent in the payload of the Acquisition Control Messages.

Figure 2:
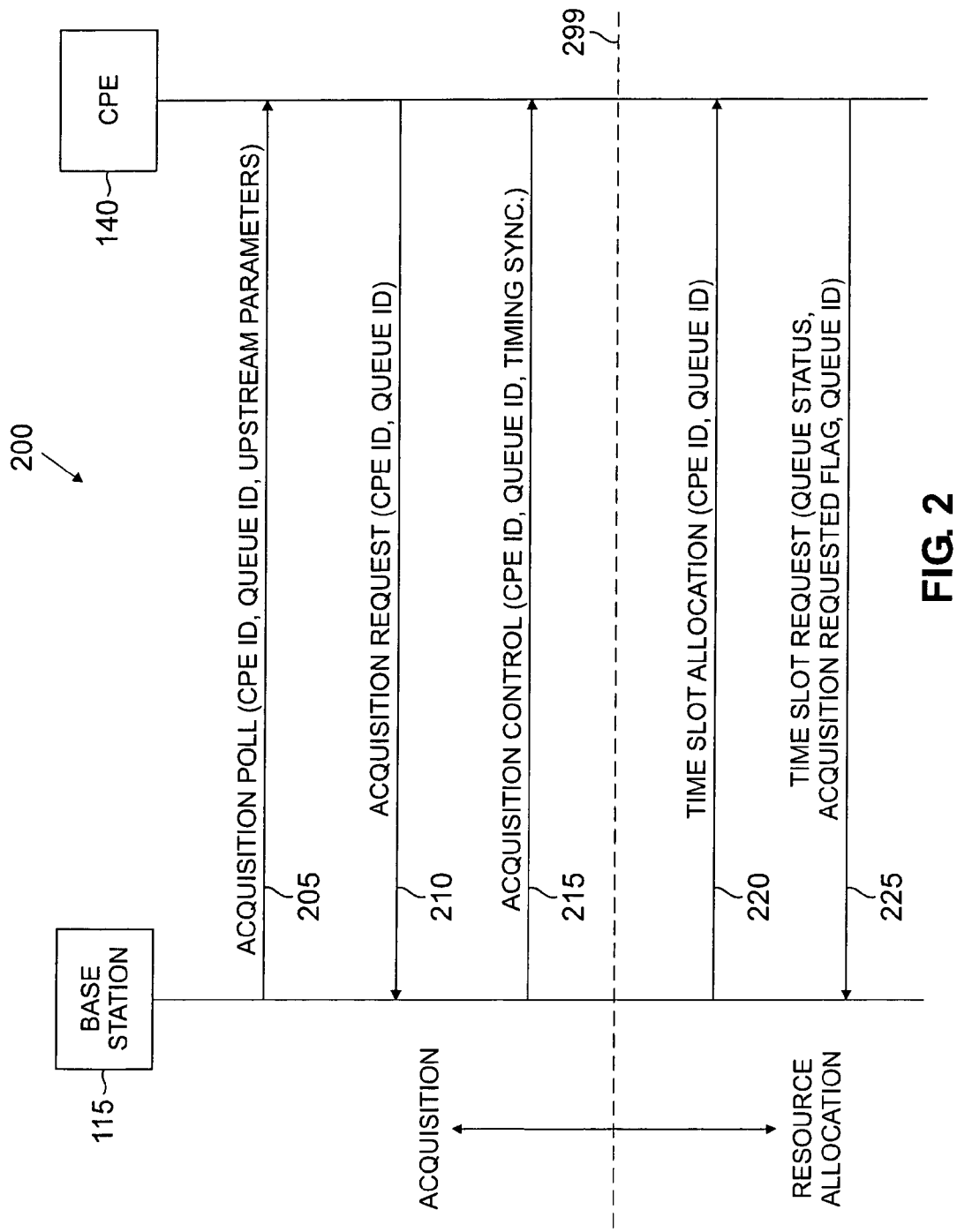
FIG. 2 is a message flow diagram illustrating the link management operations of the wireless network in FIG. 1 according to an exemplary embodiment of the present invention.

FIG. 2 depicts message flow diagram 200, which illustrates the link management operations of wireless network 100 according to an exemplary embodiment of the present invention. The link management operations include an acquisition process (above dotted line 299) and a resource allocation process (below line 299). The acquisition process comprises Acquisition Poll message 205, Acquisition Request message 210, and Acquisition Control message 215. The resource allocation process comprises Time Slot Allocation message 220 and Time Slot Request message 225.

Base station 115 controls the acquisition process. There are two types of acquisition: 1) initial acquisition and 2) queue acquisition. Initial acquisition to CPE 140 occurs when no link has yet been established to CPE 140. Once a link has been established, queue acquisition establishes connections for new queues in each CPE 140, typically for different traffic types or priorities. The queue acquisition process is part of resource management.

Base station 115 is initially provisioned with its downstream link parameters and a table that stores known CPEs 140, along with related upstream channel information. For initial acquisition, wireless base station 115 polls each CPE 140 in its table using the identifier (ID) of each CPE 140 on the predefined downstream channel. Acquisition Poll message 205 comprises CPE ID information, Queue ID information, and upstream link parameter information. CPE 140 is provisioned with the downstream channel information, as well as its own ID. CPE 140 listens on the downstream channel for its ID and replies to its acquisition poll using the assigned or implied time slot, as well as the upstream channel information provided in the poll message.

Base station 115 is provisioned with downstream link parameters. The downstream link parameters comprise frequency, modulation scheme, data rate, burst or continuous mode, and the like. Base station 115 also is provisioned with a CPE table or valid CPEs 140. The CPE table stores an identifier (ID) for each CPE 140, along with its upstream link parameters (e.g., frequency, modulation rate, data rate, etc.). In an advantageous embodiment of the present invention, the Source Address, Destination Address, and Next Time Slot are each 16-bit fields in the over-the-air framing. The CPE ID field is 12 bits, allowing ID values in the range from 0 to 4095. A Queue ID field comprises 4 bits, allowing 16 prioritized queues in each CPE 140.

Wireless base station 115 performs initial acquisition by periodically polling each CPE 140 for which it does not have an established link, allowing CPE 140 a chance to acquire a link. The polling information for Acquisition Poll message 205 is sent in the downstream framing, with the exception of the upstream parameters of Acquisition Poll message 205, which are sent in the packet payload. The initial acquisition polling rate is chosen by a trade-off between limiting the over-the-air bandwidth used for this overhead and supporting a reasonably quick acquisition time. Acquisition Poll message 205, Acquisition Request message 210, and Acquisition Control message 215 use traffic bandwidth (i.e., the message payload is not available for normal traffic). Acquisition Poll message 205 contains the upstream parameters in the payload, Acquisition Request message 210 is sent prior to the start of normal traffic flow, and Acquisition Control message 215 contains timing synchronization information in the payload.

Each CPE 140 is addressed by its ID. Downstream Acquisition Poll message 205 includes information needed by CPE 140 to start an upstream link. As stated above, this information includes upstream frequency, upstream modulation type, and upstream data rate. It is implied that CPE 140, whose ID is in the Next Time Slot, is allocated the Next Time Slot. Wireless base station 115 reserves two to four contiguous time slots for upstream Acquisition Request message 210 from CPE 140 because timing synchronization between wireless base station 115 and CPE 140 has not been established. Since CPEs 140 are at different distances from wireless base station 115, the message transit time is not known. Timing synchronization is used to account for the round trip message transit time. Wireless base station 115 does not poll any CPE 140 ID that is not provisioned, does not accept (i.e., drops) packets from any CPE 140 with an unknown ID, and does not allow two CPEs 140 with the same ID to enter network 100.

CPE 140 is provisioned with the parameters of its downstream channel, such as frequency, modulation type, data rate, and continuous or burst operation. CPE 140 listens on its downstream channel for polls addressed to CPE 140. From the payload of Acquisition Poll message 205, CPE 140 learns its upstream channel parameters, such as frequency, modulation scheme, and data rate. When Acquisition Poll message 205 is received, CPE 140 configures its upstream channel and sends Acquisition Request message 210, which contains a null payload, in the Next Time Slot. If CPE 140 is unable to complete upstream channel configuration before its transmission time, CPE 140 must wait for the next Acquisition Poll message 205 in order to send Acquisition Request message 210.

Wireless base station 115 responds to Acquisition Request message 210 with Acquisition Control message 215, which comprises timing correction information (Timing Sync.) in its payload. CPE 140 is given the Next Time Slot in Acquisition Control message 215 framing. CPE 140 corrects its timing and transmits another Acquisition Request message 210. Acquisition Request message 210 and Acquisition Control message 215 are repeatedly exchanged until timing synchronization is achieved. When timing is finally synchronized, CPE 140 transitions to the Link Established mode and participates in the resource allocation process. At this point, a link is established between wireless base station 115 and CPE 140. It is assumed that one of the sixteen queues associated with CPE 140 is dedicated to control messages, such as the link acquisition messages.

In the resource allocation process, established links use single upstream time slots, since timing has been acquired. Upstream time slots may be assigned to each CPE 140 by wireless base station 115 in its downstream framing. CPE 140 provides Queue Status flags in its upstream framing indicating to wireless base station 115 whether CPE 140 needs an increase or a decrease in the number of time slots allocated to CPE 140 in order to meet its upstream user traffic demands. Wireless base station 115 allocates the upstream time slots in messages contained in its downstream framing, based on the needs of the individual CPEs 140 and their queues.

Wireless base station 115 filters the bandwidth requests from each CPE 140 and from each of its queues, thus averaging the bandwidth needs over time. A Queue Empty status flag may be used to set the bandwidth to its lower limit immediately. Wireless base station 115 implements a lower limit and an upper limit on the number of time slots allocated to a single CPE 140 and a single queue in order to share bandwidth equitably. There is a lower limit to the number of upstream slots allocated to each CPE 140 and to each queue in a given time period to provide CPE 140 with opportunities to request more time slots and to keep the link established. Also, there is an upper limit on CPE 140 and its queues to prevent CPE 140 from monopolizing the upstream resources and to allow all CPEs 140 and queues in the sector to operate. The typical poll rate for established links is higher than the acquisition poll rate for CPEs 140 that have not yet acquired a link.

Resource allocation messages generally do not use traffic bandwidth, since they travel in the burst framing. However, if there is no downstream traffic to be sent to CPE 140, wireless base station 115 periodically sends null messages to CPE 140 to give CPE 140 time slots to use for upstream traffic and bandwidth requests. In addition to Queue Status, which is used to report on the status of the queue associated with the current payload, the upstream payload also includes fields for establishing additional connections to currently unused queues. If CPE 140 starts up a new queue, CPE 140 sets the Acquisition Requested bit in the upstream framing and provides the Queue ID of the new queue. When wireless base station 115 receives a request for a new queue, wireless base station 115 adds that new queue for that particular CPE 140 to its list of connections and allocates resources to the new queue. It is not necessary to go through the timing synchronization process, since CPE 140 has already synchronized its timing.

Figure 3:
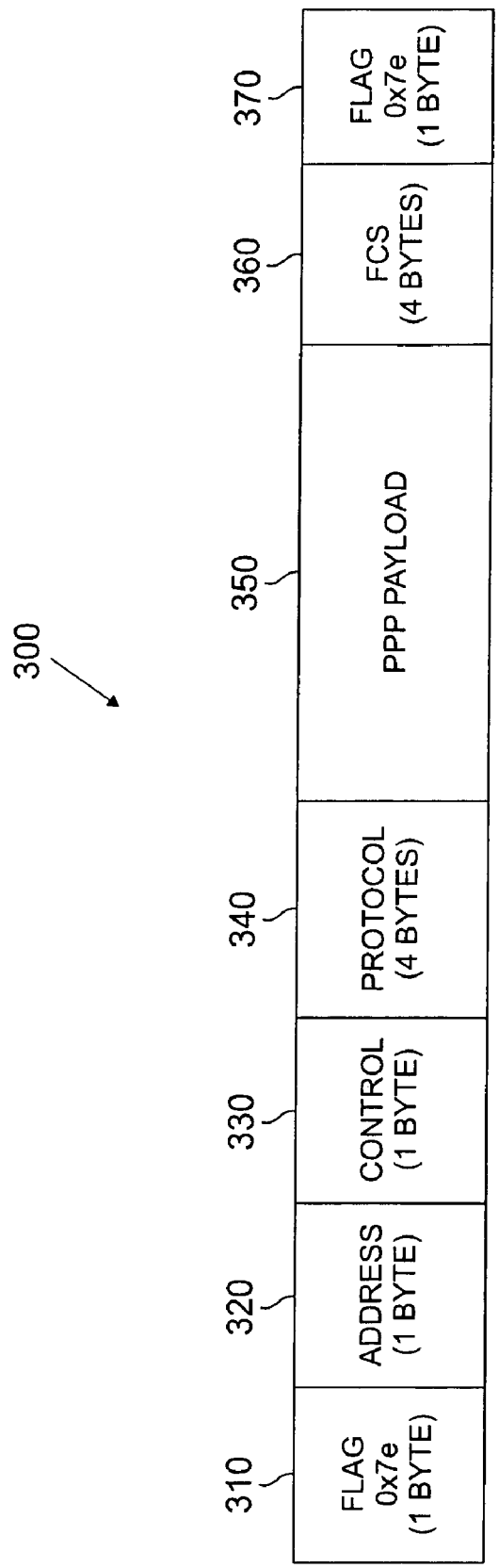
FIG. 3 illustrates an exemplary point-to-point protocol (PPP) data packet for use in the wireless network in FIG. 1 according to an exemplary embodiment of the present invention.
Figure 4:
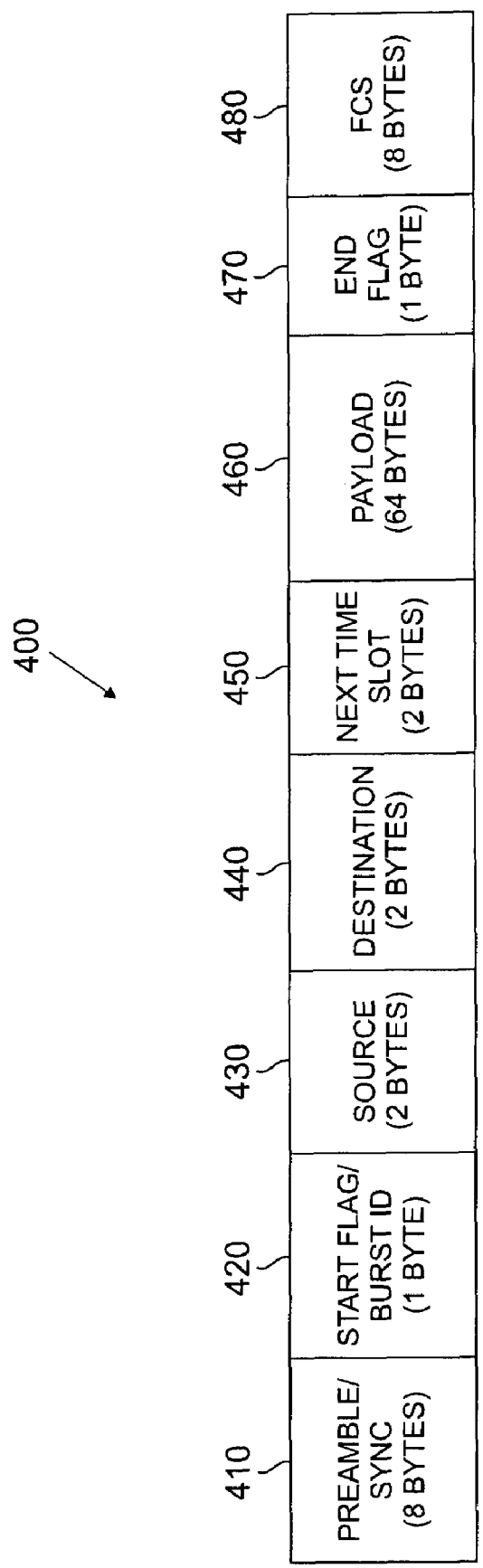
FIG. 4 illustrates an exemplary downstream data burst frame for use in the wireless network in FIG. 1 according to an exemplary embodiment of the present invention.
Figure 5:
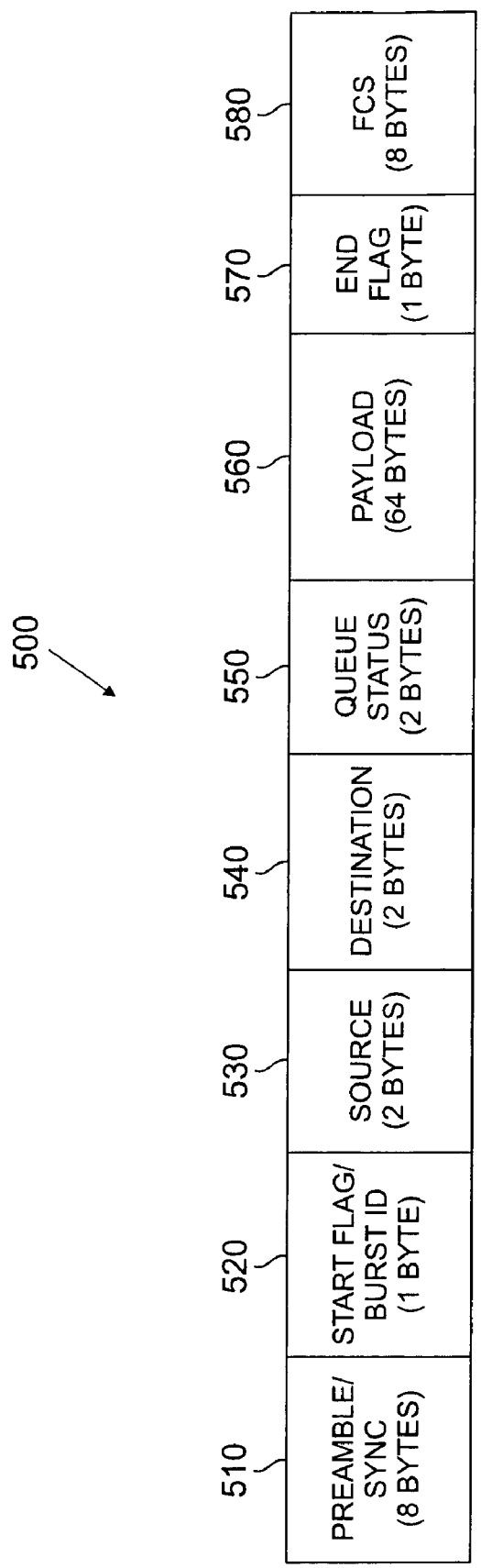
FIG. 5 illustrates an exemplary upstream data burst frame for use in the wireless network in FIG. 1 according to an exemplary embodiment of the present invention.

FIGS. 3-5 show the over-the-air formats. FIG. 3 illustrates exemplary point-to-point protocol (PPP) data packet 300 for use in wireless network 100 according to an exemplary embodiment of the present invention. PPP data packet 300 comprises Flag field 310 (1 byte), Address field 320 (1 byte), Control field 330 (1 byte), Protocol field 340 (4 bytes), PPP payload 350, Frame Check Sequence (FCS) field 360 (4 bytes), and Flag field 370 (1 byte). As will be explained below, PPP data packet 300 is transmitted on the over-the-air (OTA) interface by being segmented into 64-byte chunks that are inserted into the payloads of multiple downstream bursts and upstream bursts.

FIG. 4 illustrates exemplary downstream data burst frame 400 for use in wireless network 100 according to an exemplary embodiment of the present invention. Downstream data burst frame 400 comprises Preamble/Synchronization field 410 (8 bytes), Start Flag/Burst ID field 420 (1 byte), Source Address field 430 (2 bytes), Destination Address field 440 (2 bytes), Next Time Slot field 450 (2 bytes), payload 460 (642 bytes), End Flag field 470 (1 byte), and Frame Check Sequence (FCS) field 480 (8 bytes).

Source and destination address fields 430 and 440 define the source and destination CPE 140 and queue. Sixteen separate queues are permitted in each CPE 140, allowing connections of varying priority. According to an exemplary embodiment, the 2 bytes of Source Address field 430 comprise a 12-bit CPE ID and a 4-bit Queue ID and the 2 bytes of Destination Address field 440 comprise a 12-bit CPE ID and a 4-bit Queue ID. Similarly, the 2 bytes of Next Time Slot field 450 comprise a 12-bit CPE ID and a 4-bit Queue ID. Next Time Slot field 450 defines the CPE 140, and the queue within that CPE 140, that is assigned the next time slot.

FIG. 5 illustrates exemplary upstream data burst frame 500 for use in wireless network 100 according to an exemplary embodiment of the present invention. Upstream data burst frame 500 comprises Preamble/Synchronization field 510 (8 bytes), Start Flag/Burst ID field 520 (1 byte), Source Address field 530 (2 bytes), Destination Address field 540 (2 bytes), Queue Status field 550 (2 bytes), payload 560 (64 bytes), End Flag field 570 (1 byte), and Frame Check Sequence (FCS) field 580 (8 bytes).

Source and destination address fields 530 and 540 define the source and destination CPE 140 and queue. Sixteen separate queues are permitted in each CPE 140, allowing connections of barying priority. According to an exemplary embodiment, the 2 bytes of Source Address field 530 comprise a 12-bit CPE ID and a 4-bit bit Queue ID and the 2 bytes of Destination Address field 540 comprise a 12-bit CPE ID and a 4-bit Queue ID.

The 2 bytes of Queue Status field 550 comprise a 1-bit Acquisition Requested field, a 4-bit Queue ID, and a 2-bit Queue Status. Queue Status field 550 informs wireless base station 115 of the bandwidth needs of CPEs 140 and their individual queues. Wireless base station 115 integrates these bandwidth needs and determines how to allocate time slots to the queues of CPE 140. In addition, the Acquisition Requested field and the associated Queue ID field allow CPE 140 to request additional connections for new queues. According to an exemplary embodiment, the Queue Status bits may provide the following indications:

00=OK
01=Increasing
10=Decreasing
11=Empty

Each of data burst frames 400 and 500 has a synchronization pattern, including a synchronization word (or preamble) allowing the receiver to find the start of the burst. Each of data burst frames 400 and 500 also has a Frame Check Sequence (FCS) used to determine whether the burst was received correctly. The FCS may be, for example, a Reed-Solomon code.

Point-to-Point Protocol (PPP) data packets 300 are sent over the wireless link. Data burst frames 400 and 500 limit burst payload sizes to 64 bytes. So, larger PPP data packets 300 are segmented into chunks of 64 bytes or less. Data burst frames 400 and 500 have a Start Flag and an End flag, which indicate the start and the end of a data packet, respectively. Start Flag/Burst ID fields 420 and 520 contain a burst identifier used to re-assemble fragmented packets, as well as a bit indicating the start of a packet. End flags 470 and 570 have a bit indicating the end of a packet and a number that defines the last byte of packet data in the data burst. Segments of PPP data packets are sent in order to a single destination.

The present invention provides a wireless DSL MAC layer protocol in which wireless base station 115 allocates a single time slot, called the Next Time Slot, which has a fixed offset to the received downlink frame doing the assignment. In an alternate embodiment, it would be possible to extend this concept to include multiple time slot allocations. In addition, CPE 140 is capable of reporting queue status for a single queue that is the source of the upstream data within a single upstream data burst frame. In alternate embodiments, CPE 140 may report queue status on a different queue, on several queues, or on all of its queues. This would eliminate the need to periodically address each queue in CPE 140 to give it an opportunity to request bandwidth. Instead, it only would be necessary to address each CPE 140 periodically.

Conventional wireless systems used complicated wireless DSL MAC layer protocols with many message types, variable packet sizes, variable time slot sizes, and contention time slots. The present invention is a much simpler approach that puts the resource management information in the over-the-air framing. Also, unlike prior art systems, the present invention uses separate connections between wireless base station 115 and a single CPE to simplify traffic management for traffic prioritization and QoS.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a point-to-multipoint wireless network, a base station for transmitting downstream data packets in a downstream traffic channel to customer premises equipment (CPE) devices and receiving upstream data packets in an upstream traffic channel from said CPE devices,
   wherein said base station is capable of
   for each of a plurality of said CPE devices, establishing a plurality of associated queues;
   receiving a link management message from a first one of said plurality of CPE devices, the link management message requesting a change in bandwidth allocation for an identified queue associated with said first CPE device, wherein said link management message is associated with a wireless media access control (MAC) layer protocol; and
   in response to said link management message, re-allocating bandwidth from a first queue associated with said first CPE device to a second queue;
   wherein said base station allocates bandwidth to said second queue by transmitting a first downstream data packet, wherein said first downstream data packet comprises a Next Time Slot field capable of assigning a CPE device associated with said second queue to transmit an upstream data packet in said upstream traffic channel during a next time slot following receipt of said first downstream data packet;

wherein said first downstream data packet comprises a payload of data directed to said first CPE device.

2. The base station as set forth in claim 1 wherein said second queue is associated with said first CPE device.

3. The base station as set forth in claim 1 wherein said second queue is associated with a second CPE device of said plurality of CPE devices separate from said first CPE device.

4. The base station as set forth in claim 1 wherein said Next Time slot field is part of a header of said first downstream data packet.

5. The base station as set forth in claim 1 wherein said first downstream data packet comprises a payload of data directed to a CPE device other than said first CPE device.

6. A point-to-multipoint wireless network comprising a plurality of base stations, wherein each of said base stations transmits downstream data packets in a downstream traffic channel to customer premises equipment (CPE) devices and receives upstream data packet in an upstream traffic channel from said CPE devices, wherein said each base station is capable of:

for each of a plurality of said CPE devices, establishing a plurality of associated queues;

receiving a link management message from a first one of said plurality of CPE devices, the link management message requesting a change in bandwidth allocation for an identified queue associated with said first CPE device, wherein said link management message is associated with a wireless media access control (MAC) layer protocol; and in response to said link management message, re-allocating bandwidth from a first queue associated with said first CPE device to a second queue, wherein said each base station allocates bandwidth to said second queue by transmitting a first downstream data packet, wherein said first downstream data packet comprises a Next Time Slot field capable of assigning a CPE device associated with said second queue to transmit an upstream data packet in said upstream traffic channel during a next time slot following receipt of said first downstream data packet, wherein said first downstream data packet comprises a payload of data directed to said first CPE device.

7. The point-to-multipoint wireless network as set forth in claim 6 wherein said second queue is associated with said first CPE device.

8. The point-to-multipoint wireless network as set forth in claim 6 wherein said second queue is associated with a second CPE device of said plurality of CPE devices separate from said first CPE device.

9. The point-to-multipoint wireless network as set forth in claim 8 wherein said Next Time slot field is part of a header of said first downstream data packet.

10. The point-to-multipoint wireless network as set forth in claim 8 wherein said first downstream data packet comprises a payload of data directed to a CPE device other than said first CPE device.

11. For use in a base station of a point-to-multipoint wireless network, the base station capable of communicating with a plurality of customer premises equipment (CPE) devices, a method of reallocating bandwidth among the CPE devices comprising the steps of:

transmitting downstream data packets in a downstream traffic channel to the CPE devices;

receiving upstream data packets in an upstream traffic channel from the CPE devices;

for each of a plurality of said CPE devices, establishing a plurality of associated queues;

receiving a link management message from a first one of said plurality of CPE devices, the link management message requesting a change in bandwidth allocation for an identified queue associated with said first CPE device, wherein said link management message is associated with a wireless media access control (MAC) layer protocol; and in response to said link management message, re-allocating bandwidth from a first queue associated with said first CPE device to second queue, wherein the step of reallocating bandwidth comprises the sub-step of:

transmitting a first downstream data packet, wherein the first downstream data packet comprises a Next Time Slot field capable of assigning a CPE device associated with the second queue to transmit an upstream data packet in the upstream traffic channel during a next time slot following receipt of the first downstream data packet, wherein the first downstream data packet comprises a payload of data directed to the first CPE device.

12. The method as set forth in claim 11 wherein the second queue is associated with one of: i) the first CPE device and 2) a second CPE device of the plurality of CPE devices separate from the first CPE device.

13. The method as set forth in claim 11 wherein the Next Time slot field is part of a header of the first downstream data packet.

* * * * *